Patented June 28, 1949

2,474,719

UNITED STATES PATENT OFFICE 2,474,719

METHOD FOR SEPARATING THE STEREO-ISOMERS OF α-HYDROXY-β,β-DIMETHYL-GAMMA-BUTYROLACTONE

Ralph H. Beutel, Newark, and Max Tishler, Rahway, N. J., assignors to Merck & Co., Inc., Rahway, N. J., a corporation of New Jersey No Drawing. Application October 23, 1945, Serial No. 624,104

7 Claims. (Cl. 260—236)

1

This invention relates to a method of separating stereoisomers of α-hydroxy-β,β-dimethyl-gamma-butyrolactone, useful in the synthesis of pantothenic acid and to novel derivatives of the isomers having properties which permit their ready separation.

In accordance with one method for preparing pantothenic acid, β-alanine is condensed with the laevorotatory isomer of α-hydroxy-β,β-dimethyl-gamma-butyrolactone. The racemic lactone may be synthesized by condensing α-α-dimethyl acetaldehyde with formaldehyde to form α,α-dimethyl-β-hydroxypropionaldehyde which, upon condensation with hydrocyanic acid in the presence of calcium chloride, yields racemic α-hydroxy-β,β-dimethyl-gamma butyrolactone.

Since the dextrorotatory lactone cannot be condensed with β-alanine to produce pantothenic acid, it is desirable that it be separated from the laevorotatory isomer.

Heretofore, the racemic lactone has been resolved by converting the stereoisomers to their alkaloidal salts and separating them by fractional crystallization. The instant process eliminated the need for fractional crystallization and the complicated procedure and apparatus necessarily employed when the isomers are separated in this manner. According to this invention, the racemic lactone can be resolved into its optical isomers by precipitation of the double salt of brucine-dextrorotatory-α-gamma-dihydroxy-β,β-dimethyl-butyric acid-brucine-hydrochloride.

The reaction proceeds as follows:

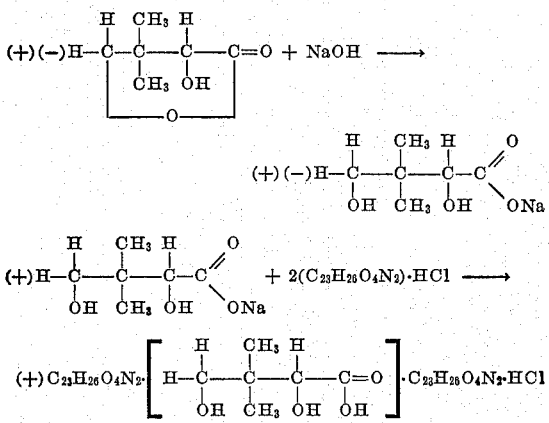

In general, the process comprises reacting the racemic lactone per se with an aqueous alkali metal hydroxide or alcoholate solution to form the alkali metal salt of racemic α-gamma-dihydroxy-β,β-dimethyl butyric acid. The reaction

2 proceeds slowly at room temperature, rapidly at 80 to 100° C., and, when complete, a suitable acid is added to the solution in an amount sufficient to neutralize any excess alkali. A stoichiometric quantity of brucine, dissolved in an inorganic acid, is then added to the above solution. The alkali metal salt of the dextrorotatory α-gamma-dihydroxy-β,β-dimethyl butyric acid reacts with the brucine acid solution to form the brucine-dextrorotatory butyric acid-brucine acid salt and the alkali metal salt of the laevorotatory α-gamma-dihydroxy-β,β-dimethyl butyric acid remains in solution.

The double salt is formed immediately. The brucine hydrochloride solution is heated to 80° C. to effect complete solution at the concentration employed. The two solutions are mixed hot and then allowed to cool down to effect the proper crystallization of the double salt. Equivalent molecular amounts of brucine and the racemic lactone should be employed in the reaction if a maximum yield of the double salt is to be obtained. Any strong inorganic acid may be used as the acid moiety of the complex but hydrochloric acid is preferred. Apparently brucine is a critical constituent. Tests indicate that alkaloids such as quinine, cinchonine, thebain, etc., do not give double salts under the conditions used to prepare the brucine double salts.

The optical configuration in the case of the α-hydroxy-β,β-dimethyl-gamma-butyrolactone and α-gamma-dihydroxy-β,β-dimethyl butyric acid is unknown at present. Dextrorotatory α-gamma-dihydroxy-β,β-dimethyl butyric acid gives rise to the laevorotatory lactone and vice versa. In order, therefore, to obtain the pure laevorotatory form of α-hydroxy-β,β-dimethyl-gamma-butyrolactone, it is necessary to treat the brucine-dextrorotatory form of α-gamma-dihydroxy-β,β-dimethyl butyric acid-brucine hydrochloride with a base and extract with chloroform or the like to remove the alkaloid.

The following example sets forth a method of carrying out the invention, but it is to be understood that it is given by way of illustration and not of limitation.

*Example*

About 2.6 g. (.02 mole) of racemic α-hydroxy-β,β-dimethyl-gamma-butyrolactone is dissolved in approximately 20 cc. of 1.04 N sodium hydroxide and heated on a steam bath for 15 minutes. Any excess sodium hydroxide present in the solution is then neutralized with hydrochloric acid. This solution, containing the racemic sodium salt of α-gamma-dihydroxy-β,β-dimethyl butyric acid, is then added to a solution of 9.32 g. (.02 mole) of brucine dissolved in a mixture of 24 cc. of hot water and 8 cc. of 2.5 N hydrochloric acid. The reaction is carried out at approximately 80° C. The solution is cooled in ice, seeded and permitted to stand for several hours. The crystalline material which is formed is removed from the supernatant liquid, washed with a small amount of ice water and dried overnight at room temperature. The product is the double salt corresponding to brucine-dextrorotatory-α-gamma-dihydroxy-β,β-dimethyl butyric acid-brucine-hydrochloride; $[\alpha]_D^{25}$ of —11.8° (0.1 g. in 5 cc. chloroform).

To obtain pure laevorotatory α-hydroxy-β,β-dimethyl-gamma-butyrolactone, the double salt obtained above is treated with a base such as aqueous sodium hydroxide and extracted with chloroform, ethylene dichloride or the like to remove the alkaloid. The alkali extract, containing the lactone is then extracted with ether, acidified, heated on a steam bath, cooled, saturated with ammonium sulfate and extracted with chloroform. Laevorotatory α-hydroxy-β,β-dimethyl-gamma-butyrolactone possessing the rotation $[\alpha]_D^{25°} = -47.0°$ in 2% water, is obtained when the extract is dried over sodium sulfate and concentrated in vacuo to dryness.

Modifications may be made in carrying out the invention without departing from the spirit of our invention or the scope of the subjoined claims.

This application is a continuation-in-part of our earlier application, now Patent No. 2,390,281.

We claim:

1. The process that includes the step comprising reacting racemic α-hydroxy-β,β-dimethyl-gamma-butyrolactone with alkali to form the alkali metal salts of racemic α-gamma-dihydroxy-β,β-dimethyl butyric acid, treating the alkali metal salts with approximately 1 molar equivalent of brucine dissolved in an inorganic acid and removing the brucine-dextrorotatory-α-gamma-dihydroxy-β,β-dimethyl butyric acid-brucine-acid salt formed.

2. The process that includes the step comprising reacting racemic α-hydroxy-β,β-dimethyl-gamma-butyrolactone with an aqueous sodium hydroxide solution to form the sodium salts of racemic α-gamma-dihydroxy-β,β-dimethyl butyric acid, treating the sodium salts with approximately 1 molar equivalent of brucine dissolved in hydrochloric acid and removing the brucine-dextrorotatory-α-gamma-dihydroxy-β,β-dimethyl butyric acid-brucine-hydrochloride formed.

3. The process that includes the step comprising reacting an alkali metal salt of racemic α-gamma-dihydroxy-β,β-dimethyl butyric acid with a solution of approximately 1 molar equivalent of brucine dissolved in an inorganic acid and removing the brucine-dextrorotatory-α-gamma-dihydroxy-β,β-dimethyl butyric acid-brucine-acid salt formed.

4. The process that includes the step comprising reacting the sodium salts of racemic α-gamma-dihydroxy-β,β-dimethyl butyric acid with a solution of approximately 1 molar equivalent of brucine dissolved in hydrochloric acid and removing the brucine-dextrorotatory-α-gamma-dihydroxy-β,β-dimethyl butyric acid-brucine-hydrochloride formed.

5. A composition of matter represented by the formula

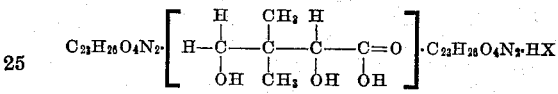

wherein X is halogen.

6. A composition of matter represented by the formula

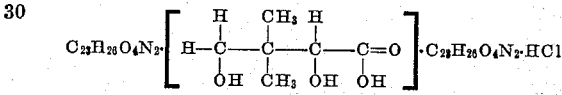

7. A brucine-dextrorotatory-α-gamma-dihydroxy-β,β-dimethyl butyric acid-brucine-hydrochloride salt having a $[\alpha]_D^{25°}$ of approximately —11.8° (0.1 g. in 5 cc. chloroform).

RALPH H. BEUTEL.
MAX TISHLER.

REFERENCES CITED

The following references are of record in the file of this patent:

UNITED STATES PATENTS

| Number | Name | Date |
|---|---|---|
| 2,319,545 | Harris et al. | May 18, 1943 |
| 2,328,000 | Finkelstein | Aug. 31, 1943 |
| 2,390,281 | Tishler et al. | Dec. 4, 1945 |